(12) United States Patent
Zhang

(10) Patent No.: US 10,855,831 B2
(45) Date of Patent: Dec. 1, 2020

(54) CONTROL METHOD FOR ELECTRONIC DEVICE, ELECTRONIC DEVICE, COMPUTER-READABLE STORAGE MEDIUM

(71) Applicant: GUANGDONG OPPO MOBILE TELECOMMUNICATIONS CORP., LTD., Guangdong (CN)

(72) Inventor: Haiping Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 86 days.

(21) Appl. No.: 16/430,939

(22) Filed: Jun. 4, 2019

(65) Prior Publication Data
US 2019/0379780 A1  Dec. 12, 2019

(30) Foreign Application Priority Data
Jun. 6, 2018 (CN) .......................... 2018 1 0574421

(51) Int. Cl.
*H04M 1/72* (2006.01)
*H04M 1/725* (2006.01)
*G09G 5/10* (2006.01)

(52) U.S. Cl.
CPC .......... *H04M 1/72569* (2013.01); *G09G 5/10* (2013.01); *G09G 2320/0247* (2013.01);
(Continued)

(58) Field of Classification Search
CPC . A61B 5/7271; G06F 3/0488; H04M 2250/12
(Continued)

(56) References Cited

U.S. PATENT DOCUMENTS

| 8,886,260 B2 * | 11/2014 | Ryu | ........................ H04L 51/38 348/14.02 |
| 9,571,781 B2 | 2/2017 | Na et al. | |

(Continued)

FOREIGN PATENT DOCUMENTS

| CN | 102204232 A | 9/2011 |
| CN | 103310719 A | 9/2013 |

(Continued)

OTHER PUBLICATIONS

International Search Report dated Aug. 26, 2019; PCT/CN2019/089965.

(Continued)

*Primary Examiner* — Kiet M Doan

(57) ABSTRACT

Disclosed is a control method for an electronic device, an electronic device and a computer-readable storage medium. An electronic device includes a transparent display screen and an infrared sensor. The transparent display screen includes a display area. The infrared sensor is stacked below the display area. The infrared sensor is configured to emit infrared light and receive infrared light reflected by an object, to detect a distance between the object and the electronic device. The control method includes operations as follows. It is determined whether the electronic device is in an outgoing call state. Control is performed to reduce the brightness of the transparent display screen in a case that the electronic device is in the outgoing call state. Control is performed to turn on the infrared sensor to detect a distance between the object and the electronic device.

11 Claims, 10 Drawing Sheets

Figure 1:
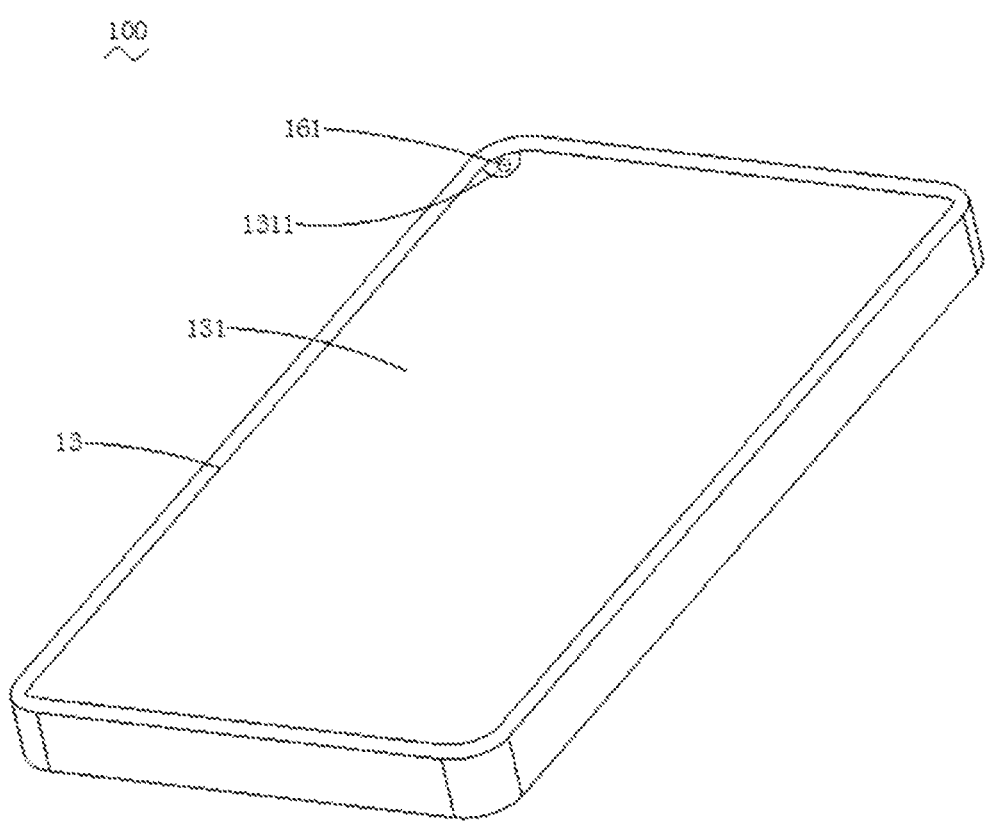
Figure 2:
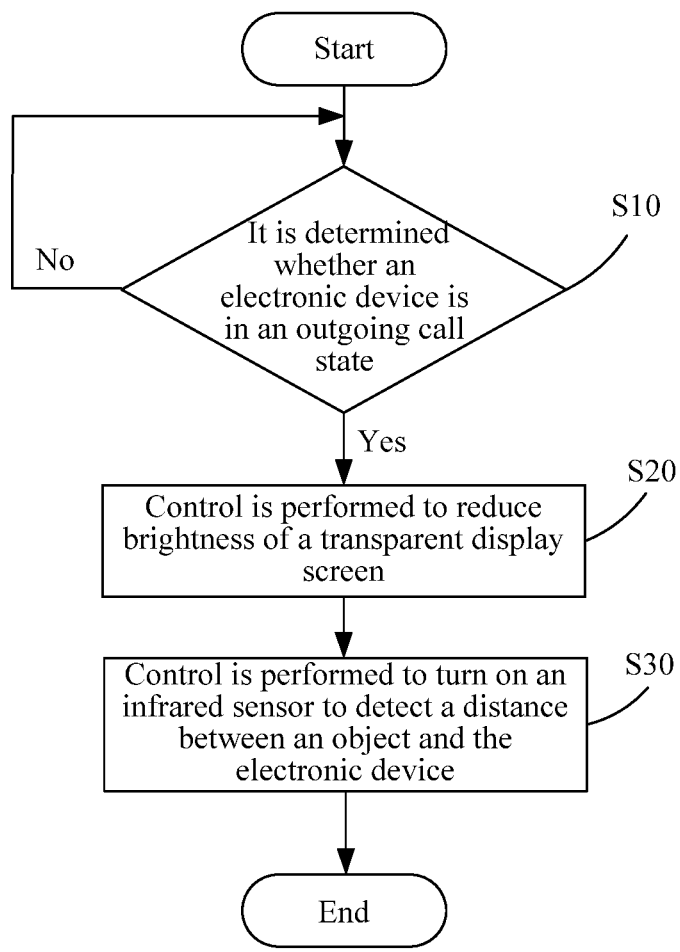

(52) U.S. Cl.
CPC . *G09G 2320/0626* (2013.01); *G09G 2354/00* (2013.01); *G09G 2360/145* (2013.01); *H04M 2250/12* (2013.01)

(58) Field of Classification Search
USPC ......... 455/567, 466, 405, 575.1, 457, 456.1, 455/418; 348/14.02; 370/338
See application file for complete search history.

(56) References Cited

U.S. PATENT DOCUMENTS

| | | | |
|---|---|---|---|
| 2003/0081133 A1* | 5/2003 | Lee .................... | H04N 5/23293 348/229.1 |
| 2007/0085157 A1 | 4/2007 | Fadell et al. | |
| 2010/0053301 A1* | 3/2010 | Ryu ..................... | H04L 51/38 348/14.02 |
| 2010/0105442 A1 | 4/2010 | Yoo | |
| 2013/0141354 A1 | 6/2013 | Tsai | |
| 2014/0152818 A1 | 6/2014 | Na et al. | |
| 2016/0026383 A1* | 1/2016 | Lee .................... | G06F 3/04886 715/773 |
| 2017/0010689 A1 | 1/2017 | Bostick et al. | |
| 2017/0118438 A1 | 4/2017 | Na et al. | |
| 2018/0260060 A1 | 9/2018 | Zhang | |
| 2018/0260079 A1 | 9/2018 | Zhang | |

FOREIGN PATENT DOCUMENTS

| | | |
|---|---|---|
| CN | 106131336 A | 11/2016 |
| CN | 106878564 A | 6/2017 |
| CN | 106933415 A | 7/2017 |
| CN | 107767835 A | 3/2018 |
| CN | 107948419 A | 4/2018 |
| CN | 107968883 A | 4/2018 |
| CN | 108833695 A | 11/2018 |
| EP | 20180675 A1 | 4/2010 |

OTHER PUBLICATIONS

Written Opinion dated Aug. 26, 2019; PCT/CN2019/089965.
Extended European Search Report dated Oct. 10, 2019; Appln. No. 19178615.1.
Second Office Action of the Chinese application No. 201810574421.3, dated Mar. 4, 2020.

* cited by examiner

CONTROL METHOD FOR ELECTRONIC DEVICE, ELECTRONIC DEVICE, COMPUTER-READABLE STORAGE MEDIUM

This application is filed based upon and claims priority to Chinese Patent Application No. 201810574421.3, filed on Jun. 6, 2018, the entire contents of which are incorporated herein by reference.

BACKGROUND

At present, bezel-less phones have become the development trend of mobile phones. In order to raise the occupation proportion of the screen in the bezel-less phone, it is necessary to stack an infrared sensor, originally disposed at the top of the screen of the mobile phone, below the display screen. Infrared light emitted by the infrared sensor in operation is prone to cause electron migration of components in the display screen, which results in a local flickering phenomenon of the display screen, and lowering user experience.

SUMMARY

In view of this, a control method for an electronic device, an electronic device and a computer-readable storage medium are provided according to the embodiments of the disclosure.

A control method for an electronic device is provided according to a first aspect of the disclosure. The electronic device includes a transparent display screen and an infrared sensor. The transparent display screen includes a display area. The infrared sensor is stacked below the display area. The infrared sensor is configured to emit infrared light and receive infrared light reflected by an object, to detect a distance between the object to the electronic device. The control method includes operations as follows.

It is determined whether the electronic device is in an outgoing call state.

Control is performed to reduce the brightness of the transparent display screen in a case that the electronic device is in the outgoing call state.

Control is performed to turn on the infrared sensor to detect a distance between the object and the electronic device.

An electronic device is provided according to a second aspect of the disclosure, which includes a transparent display screen, an infrared sensor and a processor.

The transparent display screen includes a display area.

The infrared sensor is stacked below the display area, and is configured to emit infrared light and receive infrared light reflected by an object to detect a distance from the object to the electronic device.

The processor is configured to determine whether the electronic device is in an outgoing call state, perform control to reduce brightness of the transparent display screen in a case that the electronic device is in the outgoing call state, and further perform control to turn on the infrared sensor to detect a distance between the object and the electronic device.

A non-volatile computer-readable storage medium including a computer-executable instruction is provided according to the disclosure. When being executed by one or more processors, the computer-executable instruction enables the processors to perform a control method for an electronic device. The electronic device includes a transparent display screen and an infrared sensor. The transparent display screen includes a display area. The infrared sensor is stacked below the display area. The infrared sensor is configured to emit infrared light and receive infrared light reflected by an object, to detect a distance between the object to the electronic device. The control method includes operations as follows.

It is determined whether the electronic device is in an outgoing call state.

Control is performed to reduce the brightness of the transparent display screen in a case that the electronic device is in the outgoing call state.

Control is performed to turn on the infrared sensor to detect a distance between the object and the electronic device.

BRIEF DESCRIPTION OF DRAWINGS

The above and/or additional aspects and advantages of the disclosure become apparent and are readily understood from the description for the embodiments in conjunction with the following accompanying drawings, in the accompanying drawings:

FIG. 1 is a schematic perspective view of an electronic device according to an embodiment of the disclosure.

FIG. 2 is a schematic flowchart of a control method according to an embodiment of the disclosure.

FIG. 3 is a schematic module view of a control device according to an embodiment of the disclosure.

FIG. 4 is a schematic module view of an electronic device according to an embodiment of the disclosure.

FIG. 5 is a schematic module view of a computer device according to an embodiment of the disclosure.

FIG. 6 is a schematic diagram of a scene according to an embodiment of the disclosure.

FIG. 7 is another schematic view of a scene according to an embodiment of the disclosure.

FIG. 8 is a schematic flowchart of a control method according to an embodiment of the disclosure.

FIG. 9 is another schematic flowchart of a control method according to an embodiment of the disclosure.

FIG. 10 is another schematic diagram of a scene according to an embodiment of the disclosure.

FIG. 11 is another schematic flowchart of a control method according to an embodiment of the disclosure.

FIG. 12 is another schematic flowchart of a control method according to an embodiment of the disclosure.

FIG. 13 is another schematic flowchart of a control method according to an embodiment of the disclosure.

DETAILED DESCRIPTION

The embodiments of the disclosure are described in detail below, and the examples of the embodiments are illustrated in the drawings, throughout which, the same or similar reference numerals are used to denote the same or similar elements or elements having the same or similar functions. The embodiments described below with reference to the drawings are only exemplary, and are intended to interpret the disclosure rather than being construed as limiting the disclosure.

A control method, a control device 200, an electronic device 100, a computer-readable storage medium, and a computer device 300 according to the embodiments of the disclosure are described in detail below with reference to FIG. 1 to FIG. 13.

Referring to FIG. 1 to FIG. 5, a control method for an electronic device 100 is provided according to an embodiment of the disclosure. The electronic device 100 includes a transparent display screen 13 and an infrared sensor 161. The transparent display screen 13 includes a display area 131. The infrared sensor 161 is stacked below the display area 131. The infrared sensor 161 is configured to emit infrared light and receive infrared light reflected by an object to detect a distance between the object and the electronic device 100. With the stacking arrangement, the infrared sensor 161 is disposed below the display screen 13 in a case that the electronic device 100 is placed horizontally. The method includes operations as follows.

At S10, it is determined whether the electronic device is in an outgoing call state.

At S20, control is performed to reduce brightness of the transparent display screen in a case that the electronic device is in the outgoing call state.

At S30, control is performed to turn on the infrared sensor to detect a distance between the object and the electronic device.

A control device 200 for an electronic device 100 is provided according to an embodiment of the disclosure. The control method for the electronic device 100 according to the embodiment of the disclosure may be implemented by the control device 200 according to the embodiment of the disclosure. The control device 200 includes a judgment module 21 and a control module 22. S10 may be implemented by the judgment module 21, and S20 may be implemented by the control module 22. That is, the judgment module 21 is configured to determine whether the electronic device 100 is in an outgoing call state. The control module 22 is configured to perform control to reduce the brightness of the transparent display screen 13 in a case that the electronic device 100 is in the outgoing call state, and perform control to turn on the infrared sensor 161 to detect a distance between the object and the electronic device 100.

An electronic device 100 is provided according to an embodiment of the disclosure. The electronic device 100 includes a transparent display screen 13, an infrared sensor 161 and a processor 10. The transparent display screen 13 includes a display area 131. The infrared sensor 161 is stacked below the display area 131. The infrared sensor 161 is configured to emit infrared light and receive an infrared light reflected by an object to detect a distance between the object and the electronic device 100. S10, S20 and S30 may be implemented by the processor 10. That is, the processor 10 may be configured to determine whether the electronic device 100 is in an outgoing call state, perform control to reduce the brightness of the transparent display screen 13 in a case that the electronic device 100 is in the outgoing call state, and perform control to turn on the infrared sensor 161 to detect a distance between the object and the electronic device 100.

A computer device 300 is provided according to an embodiment of the disclosure. In the embodiments of the disclosure, the control device 200 may also be applied to the computer device 300. The computer device 300 may be a mobile phone, a tablet, a laptop, a smart bracelet, a smart watch, a smart helmet, smart glasses, a game machine or the like. The electronic device 100 according to the embodiments of the disclosure may also be one of the computer devices 300.

A mobile phone is taken as an example of the electronic device 100 in the embodiment of the disclosure for illustration. An infrared sensor is generally disposed at a top position of a screen of the mobile phone to determine a distance between the mobile phone and an obstacle, and make adjustment, thereby preventing misoperation of a user and saving power of the mobile phone. When a user answers or makes a call, the infrared sensor is turned on for distance detection. When the user makes the mobile phone approaching the head, the infrared sensor generates detection information by calculating time elapsed from a time instant when an emitter emits infrared light to a time instant when reflected infrared light is received by a receiver, or generates detection information based on the intensity of the infrared light emitted by the emitter and the intensity of the reflected infrared light received by the receiver. The processor transfers an instruction to a controller based on the detection information, and the controller controls the screen to be in a blanked state in response to the instruction. The screen may include for example an LCD screen and an OLED screen. For the LCD screen, the controller may control a backlight of the LCD screen to be turned off in response to the instruction. For the OLED screen, the controller may control pixels not to illuminate in response to the instruction. When the mobile phone is brought away from the head, the processor transfers an instruction to the controller based on detection information fed back by the infrared sensor, and the controller lights up the screen in response to the instruction.

With the development of mobile phones, bezel-less phones have become a new development trend. In order to raise an occupation proportion of a screen in the mobile phone, an infrared sensor is stacked in an area below a display screen. When a user makes a call, and the infrared sensor stacked below the screen is turned on and emits infrared light for distance detection. The infrared light emitted by the infrared sensor irradiates a TFT substrate of the display screen. Due to a photoelectric effect, under irradiation of the infrared light, electrons inside the TFT substrate are excited by infrared photons to form a current. An infrared light pulse is emitted by the infrared sensor, which results in occurrence of a flickering phenomenon in the display screen.

With the control method according to the embodiment of the disclosure, it is determined whether the electronic device 100 is in an outgoing call state first. Control is performed to reduce the brightness of the transparent display screen 13 in a case that the electronic device 100 is in the outgoing call state. Control is performed to turn on the infrared sensor 161 to detect a distance between the object and the electronic device 100. In this way, when an outgoing call is made at the electronic device 100, the brightness of the screen is reduced before the infrared sensor 161 is turned on, thereby weakening a flickering of the screen caused by the infrared sensor 161.

Figure 6:
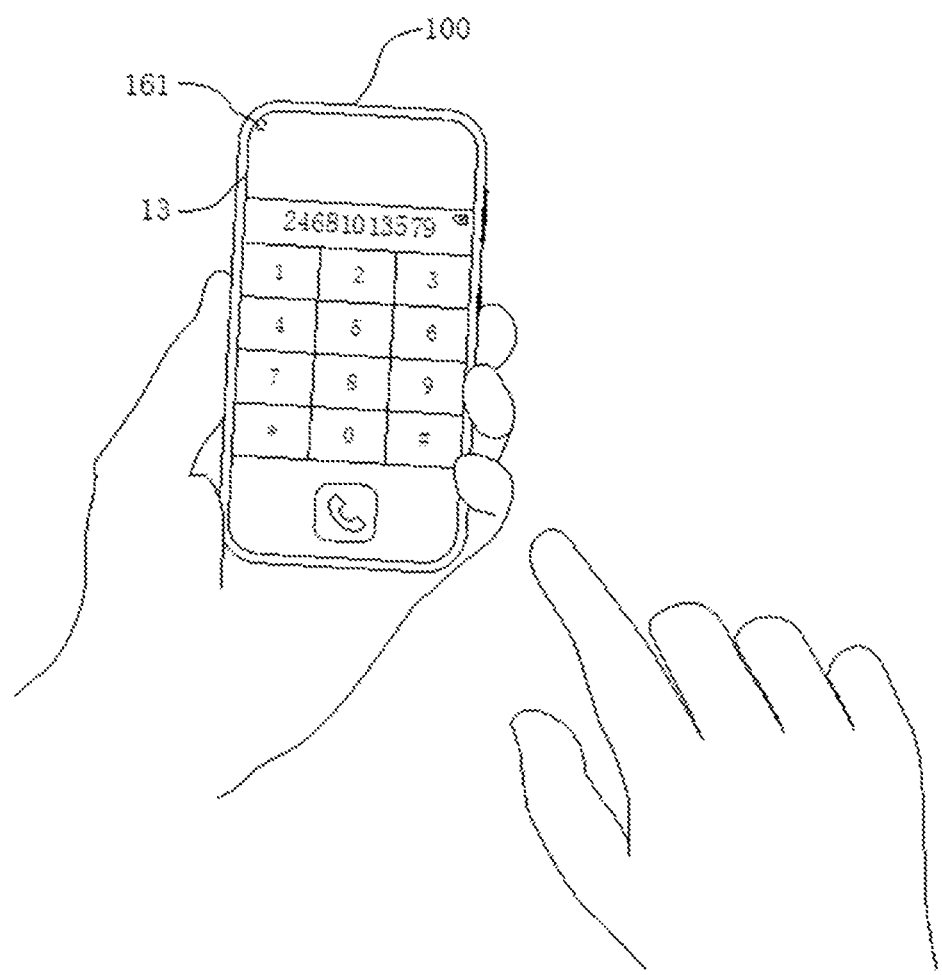
Figure 7:
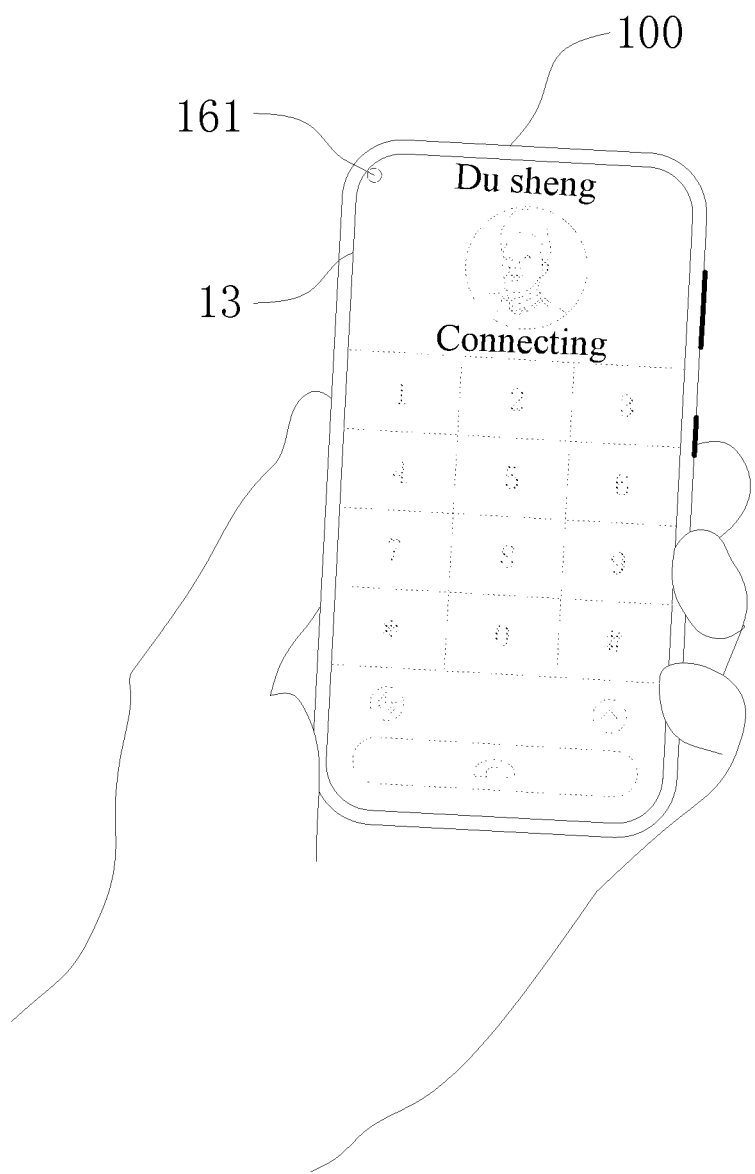

Referring to FIG. 6, whether the electronic device 100 is in an outgoing call state may be determined by detecting whether a dialing key of a dialing interface is touched by a user. Referring to FIG. 7, after the user clicks the dialing key, it is indicated that an outgoing call is made at the electronic device 100. In this case, the electronic device 100 is in the outgoing call state, the user generally does not need to view the transparent display screen 13, and the brightness of the transparent display screen 13 can be appropriately reduced, and the infrared sensor 161 is turned on for distance detection. In this case, the flickering of the transparent display screen 13 caused by the infrared sensor 161 is weakened.

It will be appreciated that in a case that the electronic device 100 is not in the outgoing call state, the electronic device 100 is kept in an original state and determines whether the electronic device 100 is in the outgoing call state again.

It should be noted that the control method according to the embodiment of the disclosure is also applied to a situation where there is an incoming call at the electronic device 100. Specifically, it may be detected whether the user answers the incoming call. When there is an incoming call at electronic device 100, information on the incoming call is displayed on the transparent display screen 13, and the user determines whether to answer the call by checking the information on the incoming call. After the user clicks an answer key, the user generally does not need to view the transparent display screen 13 at this time, and the brightness of the transparent display screen 13 may be appropriately reduced, and then the infrared sensor 161 is turned on for distance detection. It will be appreciated that the outgoing call state or the outgoing call also includes the form of outgoing calls in other voice call applications, and the incoming call state also includes the form of incoming calls in other voice call applications.

Figure 3:
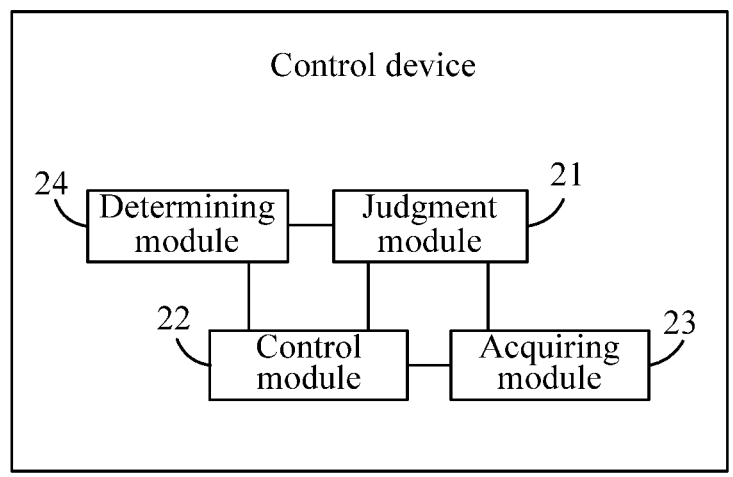
Figure 4:
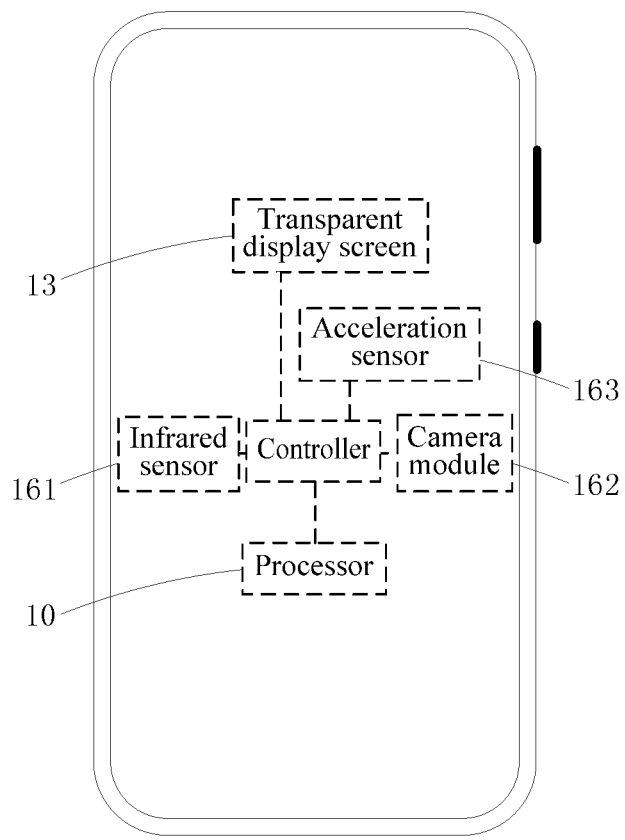
Figure 8:
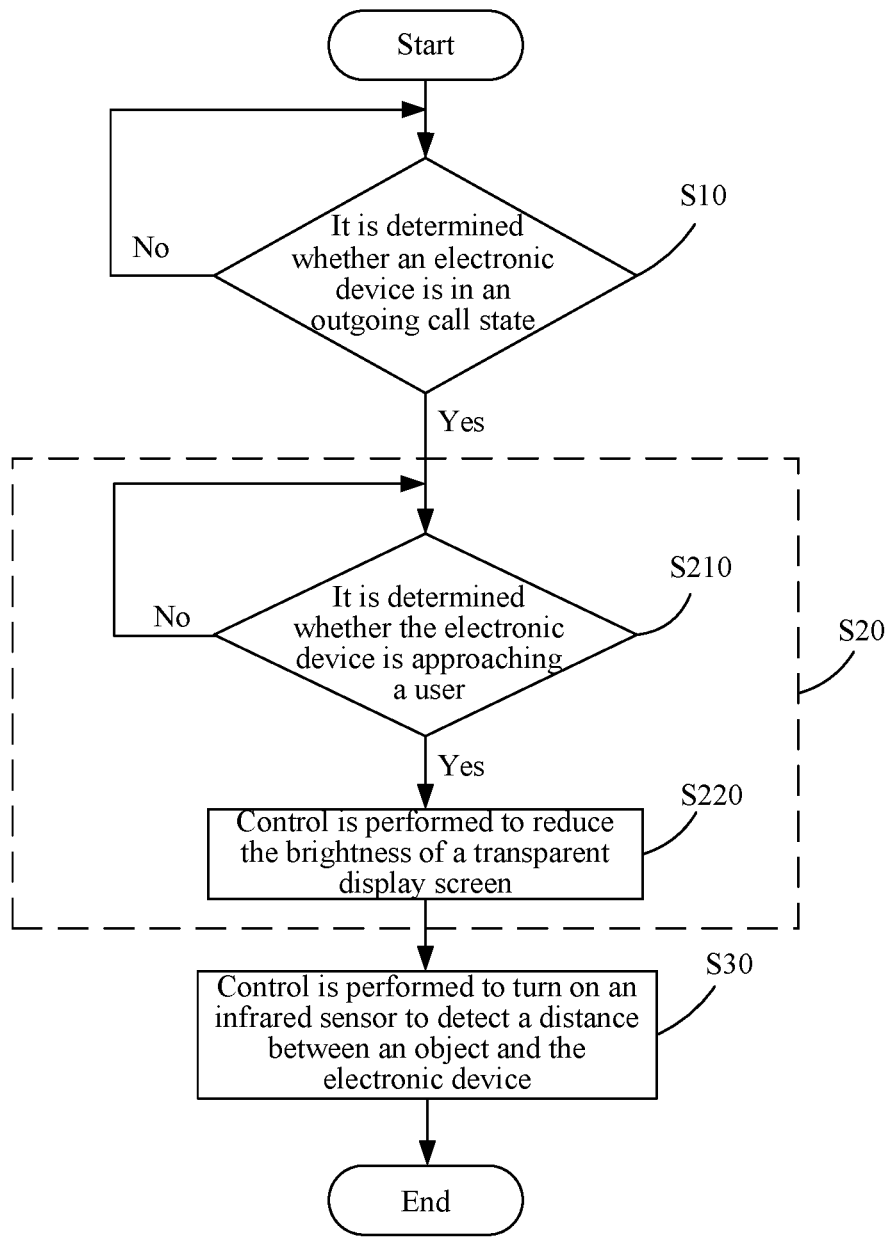

Further, referring to FIG. 3, FIG. 4 and FIG. 8, in such an embodiment, S20 that control is performed to reduce the brightness of the transparent display screen 13 includes operations as follows.

At S210, it is determined whether the electronic device is approaching a user.

At S220, control is performed to reduce the brightness of the transparent display screen in a case that the electronic device is approaching the user.

Further, in such an embodiment, S210 may be implemented by the judgment module 21, and S220 may be implemented by the control module 22. That is, the judgment module 21 is configured to determine whether the electronic device 100 is approaching a user. The control module 22 is configured to perform control to reduce the brightness of the transparent display screen 13 in a case that the electronic device 100 is approaching the user.

Further, in such an embodiment, the processor 10 of the electronic device 100 may implement S210 and S220. That is, the processor 10 is configured to determine whether the electronic device 100 is approaching a user, and reduce the brightness of the transparent display screen 13 in a case that the electronic device 100 is approaching the user.

When the electronic device 100 is approaching the user, the user generally does not need to view the transparent display screen 13, and the user prepares for a call and waits for the other party to answer, alternatively, the other party has been connected, and the user is approaching the electronic device 100 for entering the call state. Therefore, when the electronic device 100 is approaching the user, the brightness of the transparent display screen 13 may be appropriately reduced, and the infrared sensor 161 is turned on. In this way, the flickering of the transparent display screen 13 caused by the infrared light emitted by the infrared sensor 161 can be weakened.

It will be appreciated that the user may perform other operations in a case that it is detected that the electronic device 100 is in the outgoing call state and is brought away from the user. In this case, the brightness of the transparent display screen 13 may be restored for facilitating next operations of the user. In a case that it is detected that the electronic device 100 is in the outgoing call state and is approaching the user again, the brightness of the transparent display screen 13 is reduced again.

In addition, in a case that it is determined that the electronic device 100 is not approaching the user, the electronic device 100 is kept in an original state and determines whether the electronic device 100 is approaching the user again.

It should be noted that S210 that it is determined whether the electronic device 100 is approaching the user may be implemented by the following manners.

Figure 9:
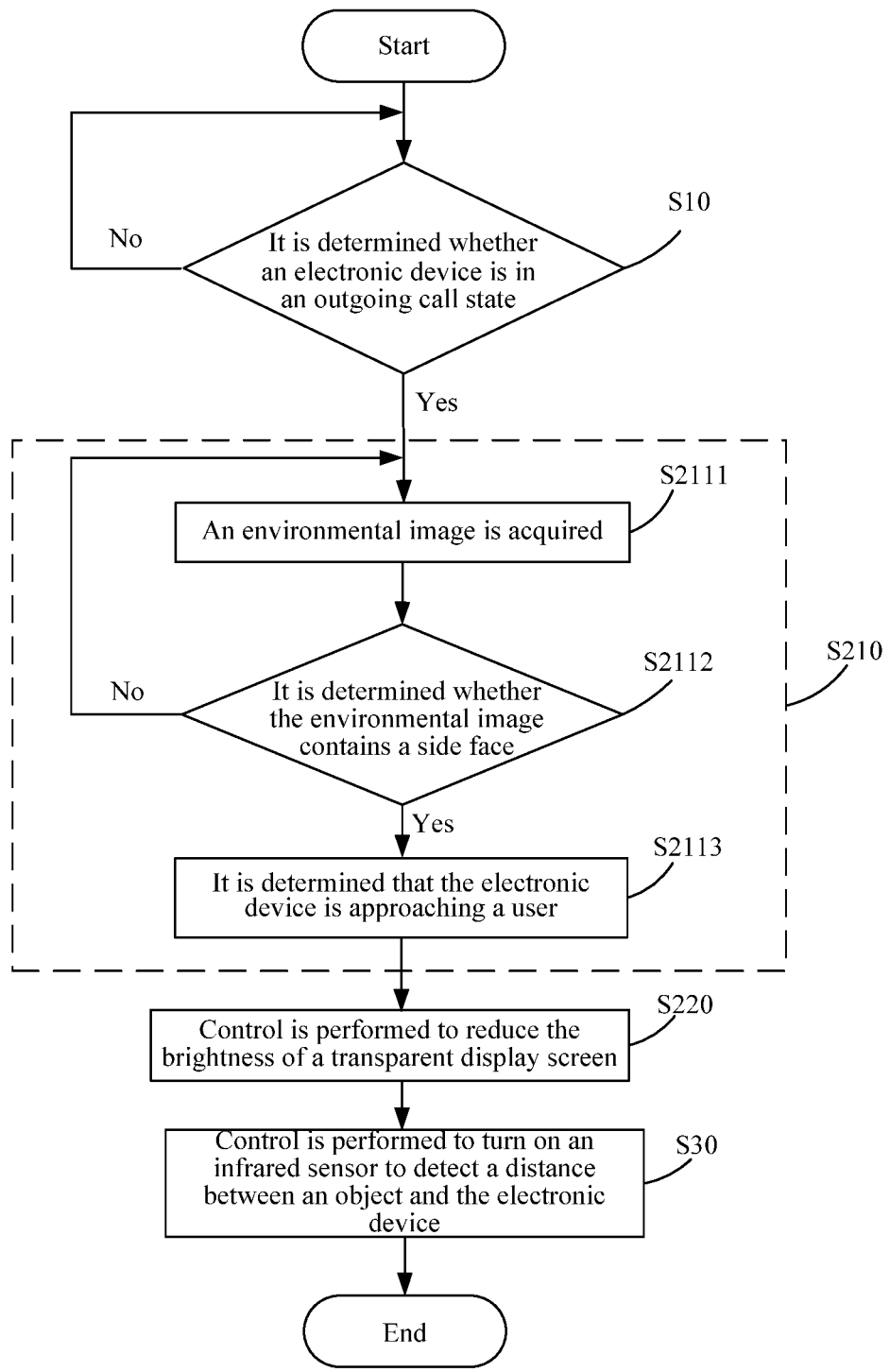

Further, referring to FIG. 3, FIG. 4 and FIG. 9, in such an embodiment, S210 in which it is determined whether the electronic device 100 is approaching the user includes operations as follows.

At S2111, an environmental image is acquired.

At S2112, it is determined whether the environmental image contains a side face.

At S2113, it is determined that the electronic device is approaching the user in a case that the environmental image contains the side face.

Further, in such an embodiment, the control device 200 includes an acquiring module 23 and a determining module 24. S2111 may be implemented by the acquiring module 23, S2112 may be implemented by the judgment module 21, and S2113 may be implemented by the determining module 24. That is, the acquiring module 23 is configured to acquire an environmental image. The judgment module 21 is configured to determine whether the environmental image contains a side face. The determining module 24 is configured to determine that the electronic device 100 is approaching the user in a case that the environmental image contains the side face.

Further, in such an embodiment, the electronic device 100 includes a camera module 162 for capturing an image. The processor 10 is configured to acquire an environmental image captured by the camera module 162, determine whether the environmental image contains a side face, and determine that the electronic device 100 is approaching the user in a case that the environmental image contains the side face.

Figure 10:
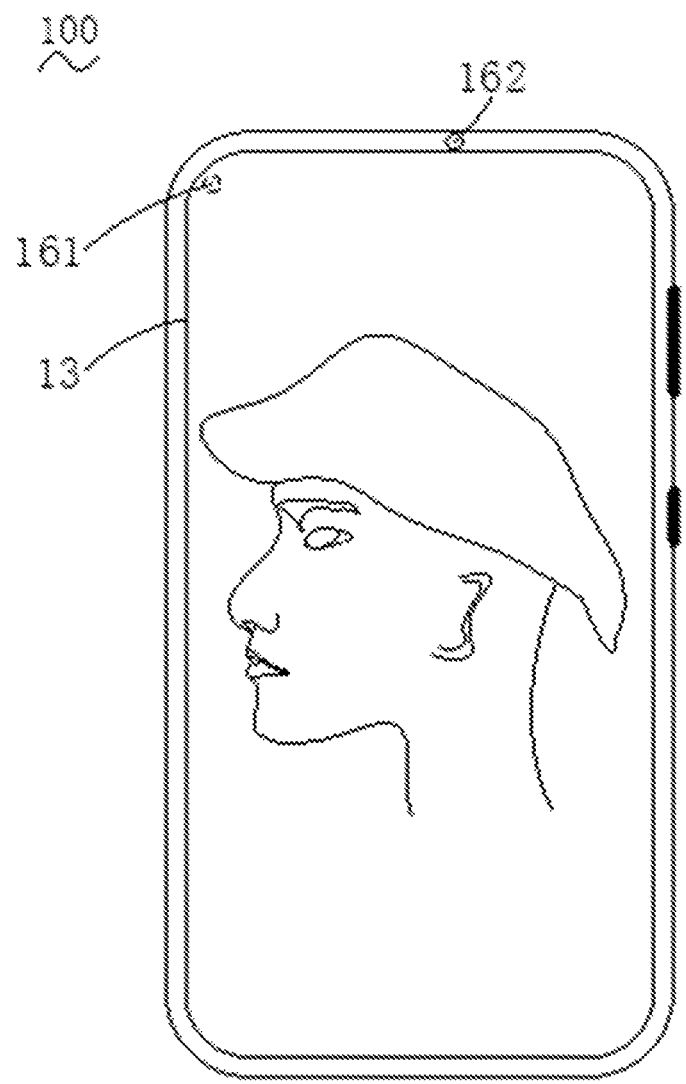

When the electronic device 100 is in an outgoing call state, an environmental image at a side opposite to the transparent display screen 13 may be captured by the camera module 162 of the electronic device 100 to determine whether the electronic device 100 is approaching the user. For example, whether the electronic device 100 is approaching the user can be determined by recognizing whether a face area is contained in a current environmental image and further recognizing whether an ear area is contained in the face area. Referring to FIG. 10, in a case that it is recognized that a side face area of the user is contained in the current environmental image and an ear area is contained in the side face area, it may be determined that the user has made the electronic device 100 approach him/her.

It will be appreciated that if it is detected that the environmental image does not contain the face area or the face image does not contain the ear area, it may be determined that the electronic device 100 is not approaching the user.

The face detection may be performed based on a preset portrait template, color, and the like in a database. In a case that a face exists in a recognized scene, a part connected to the face may be determined as a portrait area, and an implementation is not limited thereto. For example, it is also possible to determine the face by matching with the portrait template. It should be appreciated that recognition for the face area may also implemented by recognizing whether there is a continuous color block, and then recognizing a contour, so as to determine the face area and the ear area.

The camera module 162 may be a front camera of the electronic device 100. The camera module 162 may acquire an RGB image of an environment where the electronic device 100 is positioned. The camera module 162 may also be a depth camera. In a depth image, the nose, the eyes, the ears and other feature in the face area correspond to different depth data. For example, in a case that the side face faces the electronic device 100, in the captured depth image, depth data corresponding to the nose may be large, and depth data corresponding to the ears may be small. There may be multiple camera modules 162. For example, there may be two front cameras.

In addition, S210 that it is determined whether the electronic device 100 is approaching the user may also be implemented by the following manners.

Figure 11:
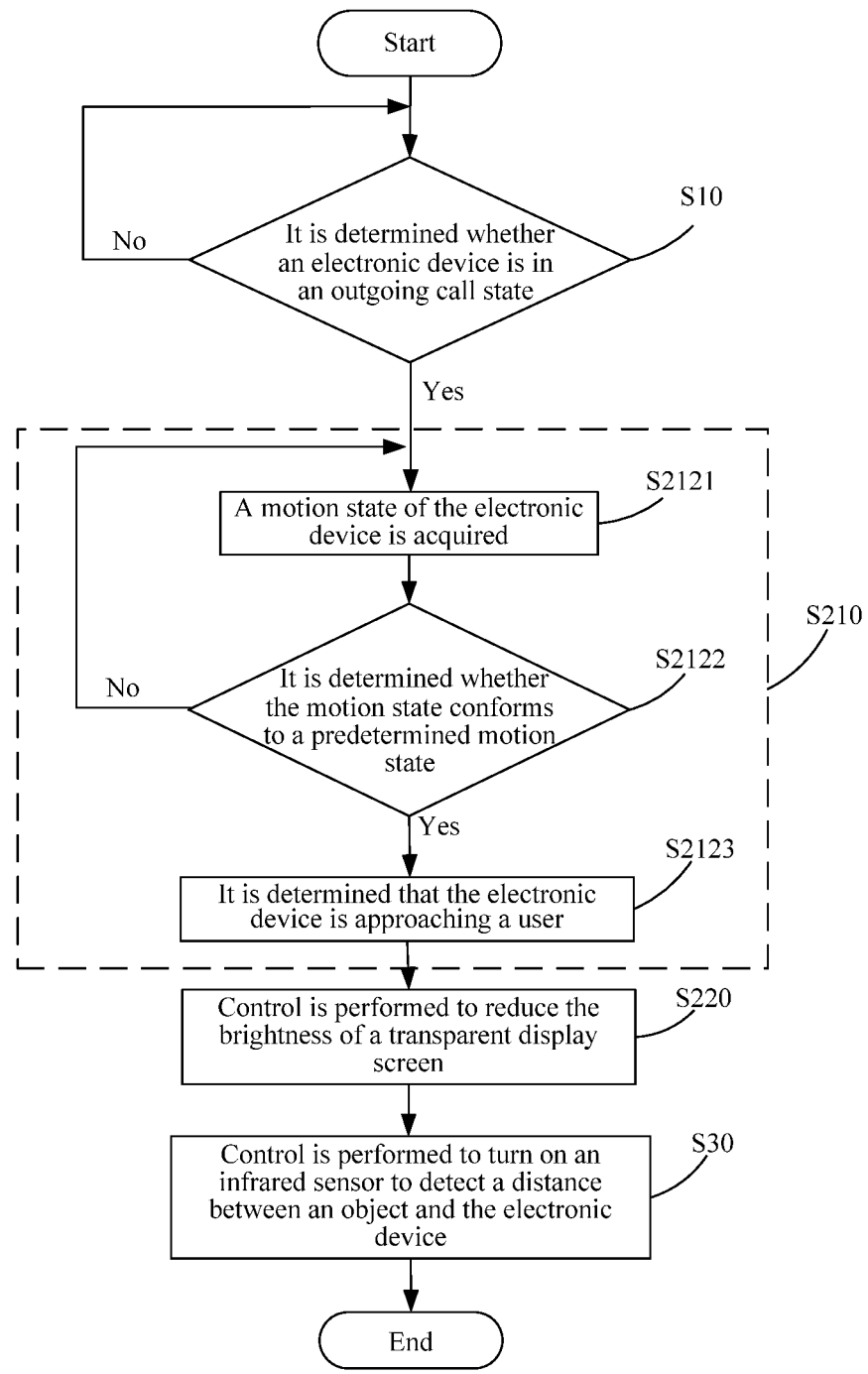

Further, referring to FIG. 3, FIG. 4 and FIG. 11, in such an embodiment, S210 that it is determined whether the electronic device 100 is approaching the user includes operations as follows.

At S2121, a motion state of the electronic device is acquired.

At S2122, it is determined whether the motion state conforms to a predetermined motion state.

At S2123, it is determined that the electronic device is approaching the user in a case that the motion state conforms to the predetermined motion state.

Further, in such an embodiment, S2121 may be implemented by the acquiring module 23, S2122 may be implemented by the judgment module 21, and S2123 may be implemented by the determining module 24. That is, the acquiring module 23 is configured to acquire a motion state of the electronic device 100. The judgment module 21 is configured to determine whether the motion state conforms to a predetermined motion state. The determining module 24 is configured to determine that the electronic device 100 is approaching the user in a case that the motion state conforms to the predetermined motion state.

Further, in such an embodiment, the electronic device 100 includes an acceleration sensor 163 configured to detect a motion state of the electronic device 100. The processor 10 is configured to acquire the motion state of the electronic device 100 detected by the acceleration sensor 163, determine whether the motion state conforms to a predetermined motion state, and determine that the electronic device 100 is approaching the user in a case that the motion state conforms to the predetermined motion state.

It may be determined whether the electronic device 100 is approaching the user by detecting whether the electronic device 100 is raised by the user. In a case that it is detected that the electronic device 100 is raised by the user, it may be determined that the electronic device 100 is approaching the user. The hand-raising action of the user may be detected by a gyroscope, an acceleration sensor 163 or the other element of the electronic device 100. In general, the gyroscope may measure a rotational angular velocity of the electronic device 100 when the electronic device 100 is deflected and inclined. The acceleration sensor 163 may capture several typical motion modes of the electronic device 100 such as shaking, swinging and rolling over. The gyroscope and the acceleration sensor 163 may detect the motion state of the electronic device 100, such as raising, shaking and swinging. Therefore, it can be determined whether the user has an action of raising the electronic device 100 based on detection data from the gyroscope or the acceleration sensor 163. It should be noted that motion data on the predetermined motion state is set according to actual conditions, and is not limited herein.

Figure 12:
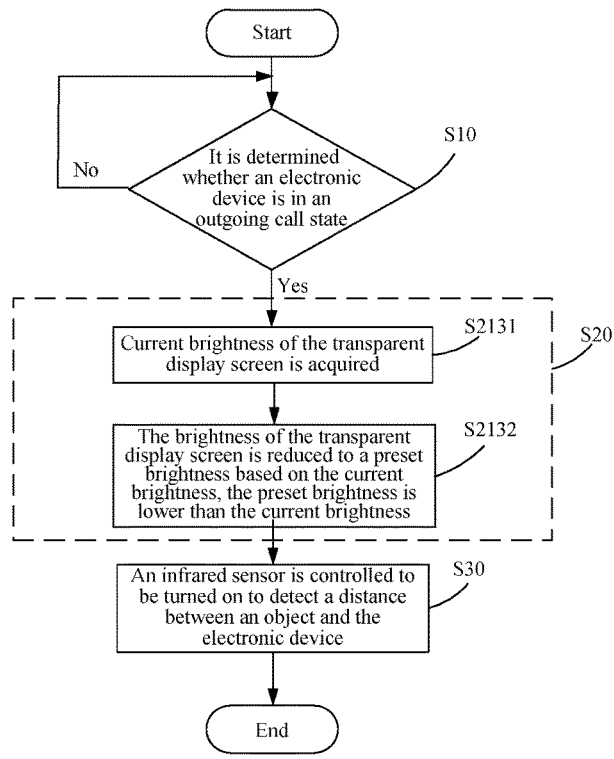

Further, referring to FIG. 3, FIG. 4 and FIG. 12, in such an embodiment, S20 that control is performed to reduce the brightness of the transparent display screen 13 includes an operation as follows.

At S2131, current brightness of the transparent display screen is acquired.

At S2132, the brightness of the transparent display screen is reduced to a preset brightness based on the current brightness. The preset brightness is lower than the current brightness.

Further, in such an embodiment, S2131 and S2132 may be implemented by the control module 22. That is, the control module 22 is configured to acquire current brightness of the transparent display screen 13, and reduce the brightness of the transparent display screen 13 to a preset brightness based on the current brightness. The preset brightness is lower than the current brightness.

Further, in such an embodiment, the processor 10 is configured to acquire current brightness of the transparent display screen 13, and reduce the brightness of the transparent display screen 13 to a preset brightness based on the current brightness. The preset brightness is lower than the current brightness.

In a case that the brightness of the transparent display screen 13 is reduced to the preset brightness, the effect of the flickering caused by the infrared light emitted by the infrared sensor 161 on the transparent display screen 13 can be weakened, which more facilitates improvement of the user experience.

Figure 13:
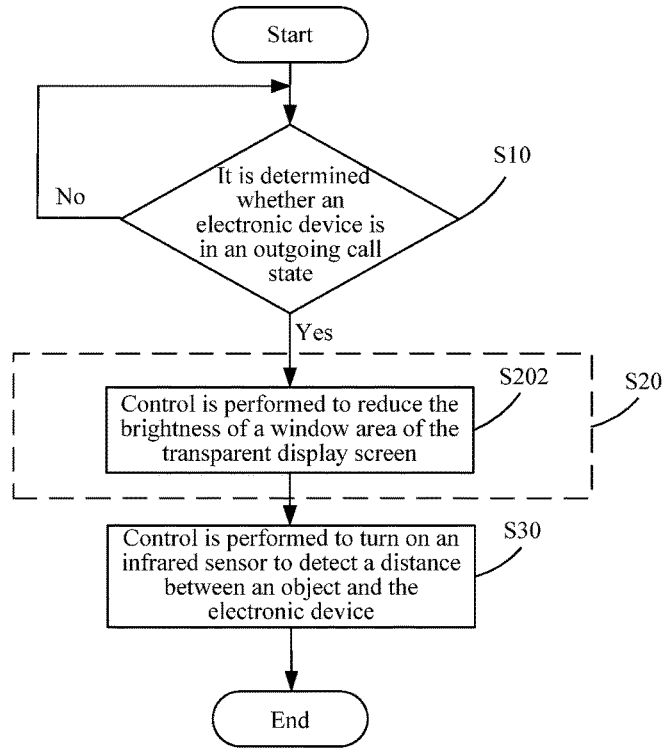

Further, referring to FIG. 13, in such an embodiment, S20 that control is performed to reduce the brightness of the transparent display screen 13 includes an operation as follows.

At S202, control is performed to reduce the brightness of the window area.

Further, in such an embodiment, S202 may be implemented by the control module 22. That is, the control module 22 is configured to perform control to reduce the brightness of a window area 1311.

Further, in such an embodiment, the display area 131 includes a window area 1311, the infrared sensor 161 is stacked below the window area 1311, and the processor 10 is configured to perform control to minimize the brightness of the transparent display screen 13.

Since the area in which flickering of the transparent display screen 13 occurs is the window area 1311 disposed opposite to the infrared sensor 161, the brightness of the window area 1311 in the transparent display screen 13 can be appropriately reduced to weaken an effect of the flickering of the infrared light emitted by the infrared sensor 161 onto the window area 1311.

A computer-readable storage medium is further provided according to an embodiment of the disclosure. A non-volatile computer-readable storage medium includes a computer-executable instruction. The computer-executable instruction, when being executed by one or more processors 10, enables the processors 10 to perform the control method for the electronic device 100 according to any one of the above embodiments. For example, the following operations are performed. At S10, it is determined whether the electronic device is in an outgoing call state. At S20, control is performed to reduce the brightness of the transparent display screen in a case that the electronic device is in the outgoing call state. At S30, control is performed to turn on the infrared sensor to detect the distance between the object and the electronic device.

Figure 5:
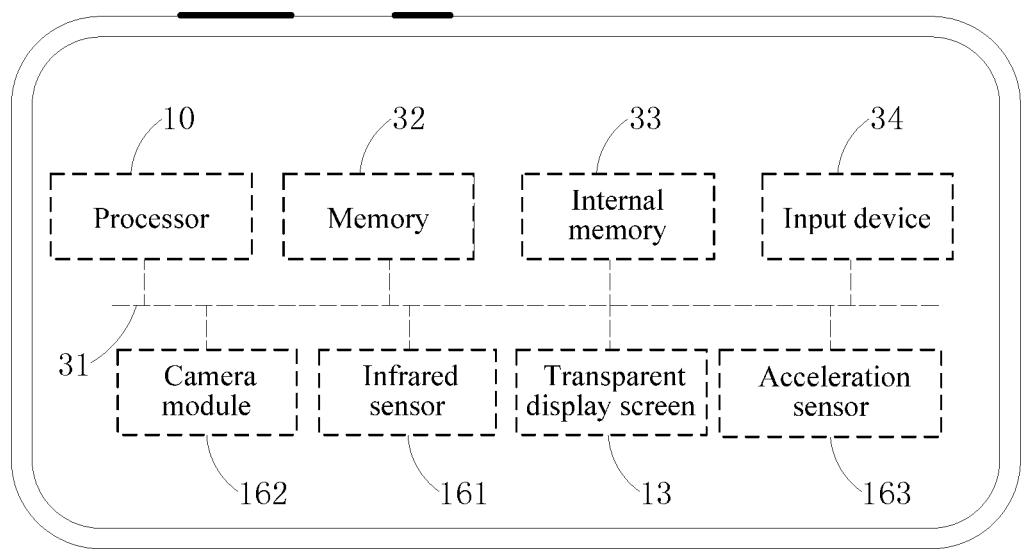

Referring to FIG. 5, a computer device 300 is further provided according to the embodiments of the disclosure. The computer device 300 includes a memory 32 and a processor 10. A computer-readable instruction is stored in the memory 32. The instruction, when being executed by the processor 10, enables the processor 10 to perform the control method for the electronic device 100 according to any one of the above embodiments. For example, the following operations are performed. At S10, it is determined whether the electronic device is in an outgoing call state. At S20, control is performed to reduce the brightness of the transparent display screen in a case that the electronic device is in the outgoing call state. At S30, control is performed to turn on the infrared sensor to detect the distance between the object and the electronic device.

FIG. 5 is a schematic diagram of an internal module of a computer device 300 according to an embodiment. As shown in FIG. 5, the computer device 300 includes a processor 10, a memory 32 (e.g., a non-volatile storage medium), an internal memory 33, a transparent display screen 13, an input device 34, an infrared sensor 161, a camera module 162 and an acceleration sensor 163 that are connected by a system bus 31. The memory 32 of the computer device 300 stores an operating system and a computer-readable instruction. The computer-readable instruction, when being executed by the processor 10, implements the control method according to any one of the above embodiments. The processor 10 may be configured to provide computing and control capabilities for supporting the operation of the entire computer device 300. The internal memory 33 of the computer device 300 provides an environment for operating the computer-readable instruction in the memory 32. The transparent display screen 13 of the computer device 300 may be an OLED display screen or a Micro LED display screen. The input device 34 may be a touch screen covering the transparent display screen 13 or may be a button, a trackball or a trackpad disposed on a housing of the computer device 300, or may also be an external keyboard, trackpad or mouse. The computer device 300 may be a mobile phone, a tablet, a laptop or the like. Those skilled in the art may understand that the structure shown in FIG. 5 only schematically shows a partial structure associated with the solution of the disclosure, and does not limit the computer device 300 to which the solution of the disclosure is applied. The computer device 300 may include parts more or fewer than those shown in FIG. 5, or combine some parts, or have different part arrangements.

The above description provides many different embodiments or examples for implementing different structures of the disclosure. In order to simplify the disclosure, the components and arrangements of the specific examples are described above. In practical, the components and arrangements of the specific examples are merely exemplary rather than limiting the disclosure. In addition, numerals and/or letters may be repeated in the different examples of the disclosure, for the purpose of simplicity and clarity. The numerals and/or letters do not indicate the relationship between the various embodiments and/or arrangements discussed. Moreover, examples of various specific processes and materials are provided in the disclosure, but application of other process and/or usage of other materials may readily occur to those skilled in the art.

In the description of the present specification, description referring to the terms "one embodiment", "some embodiments", "illustrative embodiment", "example", "specific example", or "some examples" or the like means that specific features, structures, materials or characteristics described in conjunction with embodiments or examples are contained in at least one embodiment or example of the disclosure. In the specification, the schematic representation for the above terms does not necessarily mean the same embodiment or example. Furthermore, the described features, structures, materials or characteristics may be combined in a suitable manner in any one or more embodiments or examples.

Although the embodiments of the disclosure have been shown and described, those skilled in the art may understand that various, modifications, changes, substitutions and variations may be made onto the embodiments without departing from the principle and spirit of the disclosure. The scope of the disclosure is defined by the claims and their equivalents.

The invention claimed is:

1. A control method for an electronic device, wherein the electronic device comprises a transparent display screen and an infrared sensor, the transparent display screen comprises a display area, the infrared sensor is stacked below the display area, the infrared sensor is configured to emit infrared light and receive infrared light reflected by an object, to detect a distance between the object and the electronic device, the control method comprises:
   determining whether the electronic device is in an outgoing call state; performing control to reduce brightness of the transparent display screen in a case that the electronic device is in the outgoing call state; and
   performing control to turn on the infrared sensor to detect the distance between the object and the electronic device;
   wherein the performing control to reduce the brightness of the transparent display screen comprises:
   determining whether the electronic device is approaching a user; and performing control to reduce the brightness of the transparent display screen in a case that the electronic device is approaching the user;
   determining whether the electronic device is approaching the user comprises:
   acquiring an environmental image;
   determining whether the environmental image contains a side face; and
   determining that the electronic device is approaching the user in a case that the environmental image contains the side face and
   determining whether the environmental image contains the side face comprises:
   recognizing whether the environmental image contains a face area; recognizing whether the face area contains an ear area in a case that the environmental image contains the face area; and
   determining that the environmental image contains the side face in a case that the face area contains the ear area.

2. The control method according to claim 1, wherein the determining whether the electronic device is approaching the user comprises:
   acquiring a motion state of the electronic device;
   determining whether the motion state conforms to a predetermined motion state; and
   determining that the electronic device is approaching the user in a case that the motion state conforms to the predetermined motion state.

3. The control method according to claim 2, wherein the predetermined motion state is a raising motion.

4. The control method according to claim 1, wherein the performing control to reduce the brightness of the transparent display screen comprises:

acquiring current brightness of the transparent display screen; and reducing the brightness of the transparent display screen to a preset brightness based on the current brightness, wherein the preset brightness is lower than the current brightness.

5. An electronic device, comprising:

a transparent display screen, comprising a display area;

an infrared sensor stacked below the display area, wherein the infrared sensor is configured to emit infrared light and receive infrared light reflected by an object, to detect the distance from the object to the electronic device; and a processor, configured to determine whether the electronic device is in an outgoing call state, perform control to reduce brightness of the transparent display screen in a case that the electronic device is in the outgoing call state, and perform control to turn on the infrared sensor to detect the distance between the object and the electronic device;

wherein the processor is configured to determine whether the electronic device is approaching a user, and perform control to reduce the brightness of the transparent display screen in a case that the electronic device is approaching the user; and comprising a camera module configured to capture an image, wherein the processor is configured to acquire an environmental image captured by the camera module, determine whether the environmental image contains a side face, and determine that the electronic device is approaching the user in a case that the environmental image contains the side face;

wherein the processor is further configured to:

recognize whether the environmental image contains a face area; recognize whether the face area contains an ear area in a case that the environmental image contains the face area; and determine that the environmental image contains the side face in a case that the face area contains the ear area.

6. The electronic device according to claim 5, comprising an acceleration sensor configured to detect a motion state of the electronic device, wherein the processor is configured to acquire the motion state of the electronic device detected by the acceleration sensor, determine whether the motion state conforms to a predetermined motion state, and determine that the electronic device is approaching the user in a case that the motion state conforms to the predetermined motion state.

7. The electronic device according to claim 6, wherein the predetermined motion state is a raising motion.

8. The electronic device according to claim 5, wherein the processor is further configured to:

acquire current brightness of the transparent display screen; and reduce the brightness of the transparent display screen to a preset brightness based on the current brightness, wherein the preset brightness is lower than the current brightness.

9. A non-volatile computer-readable storage medium comprising a computer-executable instruction, wherein the computer-executable instruction, when being executed by one or more processors, enables the processors to perform a control method for an electronic device, wherein the electronic device comprises a transparent display screen and an infrared sensor, the transparent display screen comprises a display area, the infrared sensor is stacked below the display area, the infrared sensor is configured to emit infrared light and receive infrared light reflected by an object, to detect a distance between the object and the electronic device, the control method comprises:

determining whether the electronic device is in an outgoing call state; performing control to reduce brightness of the transparent display screen in a case that the electronic device is in the outgoing call state; and performing control to turn on the infrared sensor to detect the distance between the object and the electronic device;

wherein the performing control to reduce the brightness of the transparent display screen comprises:

determining whether the electronic device is approaching a user; and performing control to reduce the brightness of the transparent display screen in a case that the electronic device is approaching the user;

wherein the determining whether the electronic device is approaching the user comprises:

acquiring an environmental image;

determining whether the environmental image contains a side face; and determining that the electronic device is approaching the user in a case that the environmental image contains the side face;

wherein the determining whether the environmental image contains a side face comprises:

recognizing whether the environmental image contains a face area; recognizing whether the face area contains an ear area in a case that the environmental image contains the face area; and determining that the environmental image contains the side face in a case that the face area contains the ear area.

10. The computer-readable storage medium according to claim 9, wherein the determining whether the electronic device is approaching the user comprises:

acquiring a motion state of the electronic device;

determining whether the motion state conforms to a predetermined motion state; and determining that the electronic device is approaching the user in a case that the motion state conforms to the predetermined motion state.

11. The computer-readable storage medium according to claim 9, wherein the performing control to reduce the brightness of the transparent display screen comprises:

acquiring current brightness of the transparent display screen; and reducing the brightness of the transparent display screen to a preset brightness based on the current brightness, wherein the preset brightness is lower than the current brightness.

* * * * *